(12) United States Patent
Park (10) Patent No.: US 12,032,126 B2
(45) Date of Patent: *Jul. 9, 2024

(54) OPTICAL IMAGING SYSTEM

(71) Applicant: Samsung Electro-Mechanics Co., Ltd., Suwon-si (KR)

(72) Inventor: Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 481 days.

This patent is subject to a terminal disclaimer.

(21) Appl. No.: 17/078,416

(22) Filed: Oct. 23, 2020

(65) Prior Publication Data

US 2021/0041672 A1 Feb. 11, 2021

Related U.S. Application Data

(63) Continuation of application No. 16/397,048, filed on Apr. 29, 2019, now Pat. No. 10,852,515, which is a
(Continued)

(30) Foreign Application Priority Data

Nov. 28, 2016 (KR) .................. 10-2016-0159263

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC .... G02B 13/0045; G02B 9/64; G02B 3/0087; G02B 2003/0093; G02B 13/001;
(Continued)

(56) References Cited

U.S. PATENT DOCUMENTS 8,599,495 B1 12/2013 Tsai et al.
10,852,515 B2 * 12/2020 Park .................. G02B 13/0045
(Continued)

FOREIGN PATENT DOCUMENTS

CN 202886720 U 4/2013
CN 204028445 U 12/2014
(Continued)

OTHER PUBLICATIONS

Gross, Handbook of Optical Systems, 2007, Wiley, vol. 3 (Year: 2007).*
(Continued)

*Primary Examiner* — Marin Pichler
(74) *Attorney, Agent, or Firm* — NSIP Law (57) ABSTRACT

An optical imaging system includes a first lens having a concave image-side surface, a second lens having a concave image-side surface, and a third lens having a positive refractive power. The optical imaging system includes a fourth lens having a positive refractive power and a concave object-side surface, a fifth lens, a sixth lens having a positive refractive power, and a seventh lens having a concave object-side surface. The first lens to the seventh lens are sequentially disposed at intervals from an object side toward an imaging plane.

16 Claims, 9 Drawing Sheets

Related U.S. Application Data continuation of application No. 15/445,125, filed on Feb. 28, 2017, now Pat. No. 10,317,645.

(58) Field of Classification Search
CPC .............. G02B 13/0015; G02B 13/002; G02B 13/0018; G02B 9/00; G02B 9/62; G02B 1/041; G02B 27/0025
USPC ................................. 359/708, 755, 713, 754
See application file for complete search history.

(56) References Cited

U.S. PATENT DOCUMENTS

| | | | |
|---|---|---|---|
| 2014/0043694 A1 | 2/2014 | Tsai et al. | |
| 2014/0253782 A1 | 9/2014 | Tsai et al. | |
| 2014/0376105 A1 | 12/2014 | Sekine | |
| 2015/0042863 A1 | 2/2015 | Tsai et al. | |
| 2015/0226941 A1 | 8/2015 | Fukaya | |
| 2015/0268448 A1* | 9/2015 | Kubota | G02B 9/64 359/755 |
| 2015/0316751 A1 | 11/2015 | Sekine | |
| 2016/0033742 A1 | 2/2016 | Huang | |
| 2016/0274334 A1 | 9/2016 | Lee et al. | |
| 2016/0341937 A1 | 11/2016 | Tsai et al. | |
| 2017/0045714 A1* | 2/2017 | Huang | G02B 13/0045 |
| 2017/0082835 A1 | 3/2017 | Tang et al. | |
| 2017/0168268 A1 | 6/2017 | Tang et al. | |

FOREIGN PATENT DOCUMENTS

| | | | | |
|---|---|---|---|---|
| CN | 104570280 A | * | 4/2015 | ......... G02B 13/0045 |
| CN | 105116519 A | | 12/2015 | |
| CN | 105988191 A | | 10/2016 | |
| TW | 1510804 B | | 12/2015 | |

OTHER PUBLICATIONS

Bai CN-104570280-A English language machine translation (Year: 2015).*

Chinese Office Action dated Nov. 11, 2019 in counterpart of Chinese Patent Application No. 201710347797.6 (8 pages in English and 7 pages in Chinese).

Chinese Office Action dated Mar. 16, 2020 in counterpart Chinese Patent Application No. 201710347797.6 (11 pages in English and 8 pages in Chinese).

Korean Office Action issued on Mar. 20, 2024, in counterpart Korean Patent Application No. 10-2016-0159263 (5 pages in English, 5 pages in Korean).

* cited by examiner

| FIRST EXAMPLE | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| RADIUS OF CURVATURE | 1.323 | 4.355 | 3.565 | 2.177 | 3.137 | 5.302 | -13.350 | -10.142 | -3.903 | -7.262 | 3.016 | 3.190 | 1.611 | 1.242 |
| CONIC CONSTANT(K) | -0.043 | -13.409 | -3.400 | 0.210 | 3.250 | 0.084 | 0.000 | 0.000 | -0.320 | 10.535 | -50.000 | -34.584 | -0.940 | -0.996 |
| 4th-ORDER COEFFICIENT(A) | -0.011 | -0.128 | -0.148 | -0.054 | -0.099 | -0.068 | -0.155 | -0.122 | -0.133 | -0.185 | 0.156 | 0.051 | -0.528 | -0.467 |
| 6th-ORDER COEFFICIENT(B) | 0.063 | 0.163 | 0.311 | 0.131 | 0.070 | -0.067 | -0.052 | 0.092 | 0.422 | 0.257 | -0.644 | -0.277 | 0.229 | 0.305 |
| 8th-ORDER COEFFICIENT(C) | -0.350 | 0.043 | -0.264 | -0.144 | -0.678 | 0.330 | -0.210 | -0.651 | -1.191 | -0.464 | 0.870 | 0.308 | -0.010 | -0.161 |
| 10th-ORDER COEFFICIENT(D) | 0.826 | -0.890 | 0.155 | 0.903 | 2.790 | -1.568 | 0.145 | 0.995 | 1.272 | 0.511 | -0.749 | -0.208 | -0.026 | 0.063 |
| 12th-ORDER COEFFICIENT(E) | -1.152 | 1.776 | -0.045 | -2.921 | -5.953 | 4.699 | 0.544 | -0.571 | -0.435 | -0.275 | 0.374 | 0.062 | 0.011 | -0.016 |
| 14th-ORDER COEFFICIENT(F) | 0.755 | -1.557 | 0.299 | 4.860 | 7.488 | -6.232 | -0.604 | 0.139 | -0.144 | 0.069 | -0.096 | -0.017 | -0.002 | 0.003 |
| 16th-ORDER COEFFICIENT(G) | -0.214 | 0.506 | -0.287 | -2.796 | -3.503 | 3.651 | 0.171 | -0.011 | 0.084 | -0.007 | 0.010 | 0.001 | 0.000 | 0.000 |
| 18th-ORDER COEFFICIENT(H) | 0.000 | 0.000 | 0.000 | 0.000 | 0.000 | 0.000 | 0.000 | 0.000 | 0.000 | 0.000 | 0.000 | 0.000 | 0.000 | 0.000 |
| 20th-ORDER COEFFICIENT(J) | 0.000 | 0.000 | 0.000 | 0.000 | 0.000 | 0.000 | 0.000 | 0.000 | 0.000 | 0.000 | 0.000 | 0.000 | 0.000 | 0.000 |

| SECOND EXAMPLE | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| RADIUS OF CURVATURE | 1.304 | 4.107 | 3.132 | 1.997 | 3.143 | 5.170 | -18.619 | -13.597 | -3.873 | -6.451 | 3.376 | 3.696 | 1.649 | 1.237 |
| CONIC CONSTANT(K) | -0.049 | -11.092 | -1.786 | 0.586 | 3.760 | 0.084 | 0.000 | 0.000 | -0.320 | 8.754 | -50.000 | -24.584 | -0.952 | -1.030 |
| 4th-ORDER COEFFICIENT(A) | -0.010 | -0.128 | -0.159 | -0.061 | -0.105 | -0.072 | -0.144 | -0.105 | -0.098 | -0.150 | 0.124 | 0.046 | -0.472 | -0.431 |
| 6th-ORDER COEFFICIENT(B) | 0.080 | 0.167 | 0.373 | 0.151 | 0.175 | -0.029 | -0.135 | -0.058 | 0.289 | 0.208 | -0.526 | -0.269 | 0.187 | 0.275 |
| 8th-ORDER COEFFICIENT(C) | -0.446 | 0.111 | -0.418 | 0.050 | -1.280 | 0.171 | 0.106 | -0.279 | -1.046 | -0.470 | 0.672 | 0.301 | -0.007 | -0.139 |
| 10th-ORDER COEFFICIENT(D) | 1.100 | -1.282 | 0.574 | -0.074 | 5.060 | -0.945 | -0.231 | 0.582 | 1.188 | 0.544 | -0.542 | -0.200 | -0.019 | 0.053 |
| 12th-ORDER COEFFICIENT(E) | -1.601 | 2.596 | -0.884 | -0.565 | -10.828 | 3.211 | 0.697 | -0.340 | -0.450 | -0.293 | 0.253 | 0.077 | 0.007 | -0.012 |
| 14th-ORDER COEFFICIENT(F) | 1.123 | -2.360 | 1.321 | 2.093 | 12.592 | -4.656 | -0.589 | 0.074 | -0.091 | 0.073 | -0.060 | -0.018 | -0.003 | 0.002 |
| 16th-ORDER COEFFICIENT(G) | -0.339 | 0.804 | -0.826 | -1.369 | -5.430 | 3.037 | 0.153 | -0.004 | 0.063 | -0.007 | 0.006 | 0.001 | 0.000 | 0.000 |
| 18th-ORDER COEFFICIENT(H) | 0.000 | 0.000 | 0.000 | 0.000 | 0.000 | 0.000 | 0.000 | 0.000 | 0.000 | 0.000 | 0.000 | 0.000 | 0.000 | 0.000 |
| 20th-ORDER COEFFICIENT(J) | 0.000 | 0.000 | 0.000 | 0.000 | 0.000 | 0.000 | 0.000 | 0.000 | 0.000 | 0.000 | 0.000 | 0.000 | 0.000 | 0.000 |

| THIRD EXAMPLE | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| RADIUS OF CURVATURE | 1.322 | 4.359 | 3.557 | 2.181 | 3.191 | 5.257 | -19.347 | -13.902 | -3.914 | -5.946 | 3.139 | 3.328 | 1.819 | 1.254 |
| CONIC CONSTANT(K) | -0.042 | -13.019 | -3.900 | 0.183 | 3.252 | 0.084 | 0.000 | 0.000 | -0.320 | 12.051 | -50.000 | -34.584 | -0.947 | -1.002 |
| 4th-ORDER COEFFICIENT(A) | -0.011 | -0.228 | -0.149 | -0.054 | -0.102 | -0.072 | -0.162 | -0.131 | -0.125 | -0.180 | 0.243 | 0.053 | -0.511 | -0.443 |
| 6th-ORDER COEFFICIENT(B) | 0.065 | 0.163 | 0.316 | 0.125 | 0.116 | -0.043 | -0.047 | 0.049 | 0.386 | 0.247 | -0.607 | -0.282 | 0.211 | 0.282 |
| 8th-ORDER COEFFICIENT(C) | -0.356 | 0.047 | -0.293 | -0.097 | -0.921 | 0.296 | -0.232 | -0.533 | -1.141 | -0.446 | 0.605 | 0.313 | -0.009 | -0.144 |
| 10th-ORDER COEFFICIENT(D) | 0.638 | -0.905 | 0.262 | 0.698 | 1.503 | -1.617 | 0.320 | 0.855 | 1.245 | 0.488 | -0.674 | -0.206 | -0.022 | 0.054 |
| 12th-ORDER COEFFICIENT(E) | -1.170 | 1.810 | -0.261 | -2.460 | -7.162 | 5.021 | 0.228 | -0.486 | -0.473 | -0.260 | 0.326 | 0.081 | 0.009 | -0.014 |
| 14th-ORDER COEFFICIENT(F) | 0.770 | -1.595 | 0.541 | 4.286 | 8.465 | -6.776 | -0.385 | 0.113 | -0.086 | 0.065 | -0.081 | -0.017 | -0.002 | 0.002 |
| 16th-ORDER COEFFICIENT(G) | -0.220 | 0.519 | -0.395 | -2.463 | -3.751 | 3.950 | 0.118 | -0.008 | 0.063 | -0.006 | 0.008 | 0.001 | 0.000 | 0.000 |
| 18th-ORDER COEFFICIENT(H) | 0.000 | 0.000 | 0.000 | 0.000 | 0.000 | 0.000 | 0.000 | 0.000 | 0.000 | 0.000 | 0.000 | 0.000 | 0.000 | 0.000 |
| 20th-ORDER COEFFICIENT(J) | 0.000 | 0.000 | 0.000 | 0.000 | 0.000 | 0.000 | 0.000 | 0.000 | 0.000 | 0.000 | 0.000 | 0.000 | 0.000 | 0.000 |

OPTICAL IMAGING SYSTEM

CROSS-REFERENCE TO RELATED APPLICATIONS

This application is a continuation of U.S. patent application Ser. No. 16/397,048 filed on Apr. 29, 2019, now U.S. Pat. No. 10,852,515 issued on Dec. 1, 2020, which is a continuation of U.S. patent application Ser. No. 15/445,125, filed on Feb. 28, 2017, now U.S. Pat. No. 10,317,645 issued on Jun. 11, 2019, which claims the benefit under 35 U.S.C. § 119(a) of Korean Patent Application No. 10-2016-0159263 filed on Nov. 28, 2016, in the Korean Intellectual Property Office, the entire disclosures of which are incorporated herein by reference for all purposes.

BACKGROUND

1. Field

The following description relates to an optical imaging system including seven lenses.

2. Description of Related Art

As the degree of resolution of small cameras has continued to improve, pixels included in image sensors have become smaller. For example, an image sensor of a camera having a resolution of 13 megapixels or more may have a pixel size smaller than that of an image sensor of an eight-megapixel camera. As the phenomenon described above involves a reduction in an amount of light incident on each pixel of an image sensor, it may be difficult to obtain a clear and bright image. Therefore, optical imaging systems for improving resolution and brightness are being developed.

SUMMARY

This Summary is provided to introduce a selection of concepts, in simplified form, that are further described below in the Detailed Description. This Summary is not intended to identify key features or essential features of the claimed subject matter, nor is it intended to be used as an aid in determining the scope of the claimed subject matter.

In a general aspect, an optical imaging system includes a first lens having a concave image-side surface, a second lens having a concave image-side surface, and a third lens having a positive refractive power. The optical imaging system also includes a fourth lens having a positive refractive power and a concave object-side surface, a fifth lens, a sixth lens having a positive refractive power, and a seventh lens having a concave object-side surface. The first lens to the seventh lens are sequentially disposed at intervals from an object side toward an imaging plane.

The first lens of the optical imaging system may have a convex object-side surface along the optical axis. The second lens of the optical imaging system can have a convex object-side surface along the optical axis. The third lens of the optical imaging system may have a convex object-side surface along the optical axis and a concave image-side surface along the optical axis.

The fifth lens of the optical imaging system may have a concave object-side surface along the optical axis and a convex image-side surface along the optical axis. The sixth lens of the optical imaging system can have a convex object-side surface along the optical axis and a concave image-side surface along the optical axis. The seventh lens of the optical imaging system may have a concave image-side surface along the optical axis.

In another general aspect, an optical imaging system includes a first lens, a second lens, a third lens, a fourth lens, a fifth lens, a sixth lens, and a seventh lens, sequentially disposed from an object side toward an imaging plane. The optical imaging system satisfies the conditional expression $f2/f<-2.0$, where f represents an overall focal length of the optical imaging system and f2 is a focal length of the second lens.

The optical imaging system may satisfy the conditional expression $0<f1/f<2.0$, where f represents an overall focal length of the optical imaging system and f1 represents a focal length of the first lens. The optical imaging system can satisfy the three conditional expressions $25<V1-V2<45$, $V1-V3<25$, and $25<V1-V5<45$, where V1 represents an Abbe number of the first lens, V2 represents an Abbe number of the second lens, V3 represents an Abbe number of the third lens, and V5 represents an Abbe number of the fifth lens.

The optical imaging system may satisfy the conditional expression $1.5<f3/f$, where f represents an overall focal length of the optical imaging system and f3 represents a focal length of the third lens. The optical imaging system can also satisfy the conditional expression $3.0<|f4/f|$, where f represents an overall focal length of the optical imaging system and f4 represents a focal length of the fourth lens. The optical imaging system can include concave image-side surfaces on the first lens and the sixth lens, as well as a concave object-side surface of the fourth lens.

In another general aspect, an optical imaging system includes a first lens having a positive refractive power, a second lens having a negative refractive power, and a third lens. The optical imaging system also includes a fourth lens having a convex image-side surface along the optical axis, a fifth lens having a negative refractive power, a sixth lens, and a seventh lens having a negative refractive power.

The optical imaging system can satisfy the conditional expression $-1.3<f1/f2$, where f1 represents a focal length of the first lens and f2 represents the focal length of the second lens. The optical imaging system may satisfy the conditional expression $f5/f<0$, where f represents an overall focal length of the optical imaging system and f5 represents a focal length of the fifth lens. The optical imaging system can satisfy the conditional expression $f7/f<0$, where f represents an overall focal length of the optical imaging system and f7 represents a focal length of the seventh lens.

Other features and aspects will be apparent from the following detailed description, the drawings, and the claims.

Throughout the drawings and the detailed description, the same reference numerals refer to the same elements, where applicable. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are well known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various components, regions, or sections, these components, regions, or sections are not to be limited by these terms. Rather, these terms are only used to distinguish one component, region, or section from another component, region, or section. Thus, a first component, region, or section referred to in examples described herein may also be referred to as a second component, region, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Examples provide optical imaging systems having a high degree of brightness and having high resolution for mounting in a small terminal. Hereinafter, examples are described in further detail with reference to the accompanying drawings.

In accordance with an example, a first lens refers to a lens closest to an object or a subject from which an image is captured. A seventh lens is a lens closest to an imaging plane or an image sensor. In an embodiment, all radii of curvature of lenses, thicknesses, a distance from an object-side surface of a first lens to an imaging plane (OAL), a half diagonal length of the imaging plane (IMG HT), and focal lengths of each lens are indicated in millimeters (mm). A person skilled in the relevant art will appreciate that other units of measurement may be used. Further, in embodiments, all radii of curvature, thicknesses, OALs (optical axis distances from the first surface of the first lens to the image sensor), a distance on the optical axis between the stop and the image sensor (SLs), image heights (IMGHs) (image heights), and back focus lengths (BFLs) of the lenses, an overall focal length of an optical system, and a focal length of each lens are indicated in millimeters (mm). Further, thicknesses of lenses, gaps between the lenses, OALs, TLs, SLs are distances measured based on an optical axis of the lenses.

A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

In accordance with illustrative examples, the embodiments described of the optical system include seven lenses with a refractive power. However, the number of lenses in the optical system may vary, for example, between two to seven lenses, while achieving the various results and benefits described below. Also, although each lens is described with a particular refractive power, a different refractive power for at least one of the lenses may be used to achieve the intended result.

An optical imaging system includes seven lenses. For example, the optical imaging system may include a first lens, a second lens, a third lens, a fourth lens, a fifth lens, a sixth lens, and a seventh lens, sequentially disposed from an object side.

The first lens has a refractive power. For example, the first lens has a positive refractive power. One surface of the first lens is concave. In an embodiment, an image-side surface of the first lens may be concave.

The first lens may have an aspherical surface. For example, both surfaces of the first lens are aspherical. The first lens is formed of a material having a high degree of light transmissivity and excellent workability. In an example, the first lens is formed of a plastic material. However, the material of the first lens is not limited to being a plastic material. In another example, the first lens may be formed of a glass material. The first lens may have a low refractive index. In an embodiment, the refractive index of the first lens is lower than 1.6.

The second lens has a refractive power. For example, the second lens has a negative refractive power. One surface of the second lens is concave. In an embodiment, an image-side surface of the second lens is concave.

The second lens has an aspherical surface. For example, an object-side surface of the second lens is aspherical. The second lens is formed of a material having a high degree of light transmissivity and excellent workability. In an example, the second lens is formed of a plastic material. However, a material of the second lens is not limited to being plastic. In another example, the second lens may be formed of a glass material. The second lens may have a refractive index higher than that of the first lens. In an embodiment, the refractive index of the second lens is 1.65 or higher.

The third lens has a refractive power. For example, the third lens has a positive refractive power. The third lens has an aspherical surface. For example, an image-side surface of the third lens is an aspherical surface.

The third lens is formed of a material having a high degree of light transmissivity and excellent workability. For example, the third lens is formed of a plastic material. However, a material of the third lens is not limited to being plastic. In another example, the third lens may be formed of a glass material. The third lens has a refractive index substantially similar to that of the first lens. In an embodiment, the refractive index of the third lens is lower than 1.6.

The fourth lens has a refractive power. For example, the fourth lens has a positive refractive power. One surface of the fourth lens is concave. In an embodiment, an object-side surface of the fourth lens is concave.

The fourth lens has an aspherical surface. For example, both surfaces of the fourth lens are aspherical. The fourth lens is formed of a material having a high degree of light transmissivity and excellent workability. In an example, the fourth lens is formed of a plastic material. However, a material of the fourth lens is not limited to being plastic. In another example, the fourth lens may be formed of a glass material. The fourth lens has a refractive index substantially the same as that of the third lens. For example, the refractive index of the fourth lens is lower than 1.6.

The fifth lens has a refractive power. For example, the fifth lens has a negative refractive power. The fifth lens includes an aspherical surface. For example, both surfaces of the fifth lens are aspherical.

The fifth lens is formed of a material having a high degree of light transmissivity and excellent workability. In an example, the fifth lens is formed of a plastic material. However, a material of the fifth lens is not limited to being plastic. In another example, the fifth lens may be formed of a glass material. The fifth lens has a refractive index higher than that of the first lens. For example, the refractive index of the fifth lens is 1.6 or higher.

The sixth lens has a refractive power. For example, the sixth lens has a positive refractive power. The sixth lens has an inflection point. In an embodiment, both surfaces of the sixth lens have one or more inflection points.

The sixth lens has an aspherical surface. As an example, both surfaces of the sixth lens are aspherical. The sixth lens is formed of a material having a high degree of light transmissivity and excellent workability. In an example, the sixth lens is formed of a plastic material. However, a material of the sixth lens is not limited to being plastic. In another example, the sixth lens may be formed of a glass material. The sixth lens has a refractive index substantially similar to that of the fifth lens. For example, the refractive index of the sixth lens is 1.6 or higher.

The seventh lens has a refractive power. For example, the seventh lens has a negative refractive power. One surface of the seventh lens is convex. In an embodiment, an object-side surface of the seventh lens is convex. The seventh lens has an inflection point. For example, both surfaces of the seventh lens have one or more inflection points.

The seventh lens has an aspherical surface. For example, both surfaces of the seventh lens are aspherical. The seventh lens is formed of a material having a high degree of light transmissivity and excellent workability. In an example, the seventh lens is formed of a plastic material. However, a material of the seventh lens is not limited to being plastic. In another example, the seventh lens may be formed of a glass material. The seventh lens has a refractive index lower than that of the sixth lens. For example, the refractive index of the seventh lens is lower than 1.6.

Aspherical surfaces of the first lens to the seventh lens may be represented by Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ [Equation 1]

In Equation 1, c represents an inverse of a radius of curvature of the lens, k represents a conic constant, r represents a distance from a certain point on an aspherical surface of the lens to an optical axis, A to J represent aspherical constants, and Z (or SAG) represents a distance between the certain point on the aspherical surface of the lens at the distance r and a tangential plane meeting the apex of the aspherical surface of the lens.

The optical imaging system further includes a filter, an image sensor, and a stop. The filter may be disposed between the seventh lens and the image sensor. The filter may block some wavelengths of light to obtain a clear image. For example, the filter blocks infrared wavelengths of light.

The image sensor forms an imaging plane. For example, a surface of the image sensor forms an imaging plane. The stop is disposed to adjust an amount of light incident on a lens. In examples, the stop may be disposed between the second lens and the third lens, or between the third lens and the fourth lens.

The optical imaging system satisfies any one of or any combination of any two or more of the following Conditional Expressions:

| | |
|---|---|
| $0 < f1/f < 2.0$ | [Conditional Expression 1] |
| $25 < V1-V2 < 45$ | [Conditional Expression 2] |
| $V1-V3 < 25$ | [Conditional Expression 3] |
| $25 < V1-V5 < 45$ | [Conditional Expression 4] |
| $f2/f < -2.0$ | [Conditional Expression 5] |
| $1.5 < f3/f$ | [Conditional Expression 6] |
| $3.0 < |f4/f|$ | [Conditional Expression 7] |
| $f5/f < 0$ | [Conditional Expression 8] |

$0 < f6/f$ [Conditional Expression 9]

$f7/f < 0$ [Conditional Expression 10]

$OAL/f < 1.4$ [Conditional Expression 11]

$-1.3 < f1/f2$ [Conditional Expression 12]

$-2.0 < f2/f3 < 0$ [Conditional Expression 13]

$BFL/f < 0.4$ [Conditional Expression 14]

$D2/f < 0.1$ [Conditional Expression 15]

$80 < FOV$ [Conditional Expression 16]

$F\ No. \leq 2.05$ [Conditional Expression 17]

In the Conditional Expressions, f represents an overall focal length of the optical imaging system, f1 represents a focal length of the first lens, f2 represents a focal length of the second lens, f3 represents a focal length of the third lens, f4 represents a focal length of the fourth lens, f5 represents a focal length of the fifth lens, f6 represents a focal length of the sixth lens, f7 represents a focal length of the seventh lens, V1 represents an Abbe number of the first lens, V2 represents an Abbe number of the second lens, V3 represents an Abbe number of the third lens, and V5 represents an Abbe number of the fifth lens. In addition, OAL represents a distance from an object-side surface of the first lens to an imaging plane, BFL represents a distance from an image-side surface of the seventh lens to an imaging plane, and D2 represents a distance from an image-side surface of the first lens to an object-side surface of the second lens.

Conditional Expression 1 is a relational expression for limiting the refractive power of the first lens. In a case when the first lens is outside of the numerical range of Conditional Expression 1, refractive power distribution of different lenses may be limited.

Conditional Expressions 2 through 4 are relational expressions for improving chromatic aberration of an optical imaging system. For example, improvement of chromatic aberration of an optical imaging system may be limited in cases outside of the numerical ranges of Conditional Expressions 2 through 4.

Conditional Expressions 5 through 7 are relational expressions for improving aberration correction of an optical imaging system. For example, aberration correction in optical imaging systems outside of the numerical ranges of Conditional Expressions 5 through 7 are limited, because refractive power of the second lens to the fourth lens is significantly high or low.

Conditional Expressions 8 through 10 are relational expressions for limiting the refractive power of an imaging optical system. For example, maintaining a desired refractive power of the fifth lens to the seventh lens is limited in cases outside of the numerical ranges of Conditional Expressions 8 through 10.

Conditional Expressions 11 and 14 are relational expressions for miniaturization of the optical imaging system. For example, in optical imaging systems outside of the numerical ranges of Conditional Expressions 11 and 14, a distance from the first lens to an imaging plane is significantly long. Thus, the optical imaging system cannot be sufficiently miniaturized.

Conditional Expressions 12 and 13 are relational expressions for improving aberration characteristics of the optical imaging system. For example, in optical imaging systems outside of the numerical ranges of Conditional Expressions 12 and 13, a refractive power of a specific lens of the first lens to the third lens is significantly large. Thus, aberration characteristics may deteriorate. Conditional Expression 15 is also a relational expression for improving aberration characteristics of an optical imaging system. For example, improvement to longitudinal chromatic aberration of an optical imaging system is limited in cases outside of an upper limit value of Conditional Expression 15.

The optical imaging system satisfying Conditional Expressions described above may obtain a bright image. For example, the optical imaging system may have an F number of 2.05 or less. In addition, the optical imaging system may implement a resolution of 13 megapixels or more, and may have a wide angle of view of 80 degrees or more.

Next, optical imaging systems, according to several examples, will be described. First, an optical imaging system, according to a first example, will be described with reference to FIG. 1. An optical imaging system 100 includes a first lens 110, a second lens 120, a third lens 130, a fourth lens 140, a fifth lens 150, a sixth lens 160, and a seventh lens 170.

Figure 1:
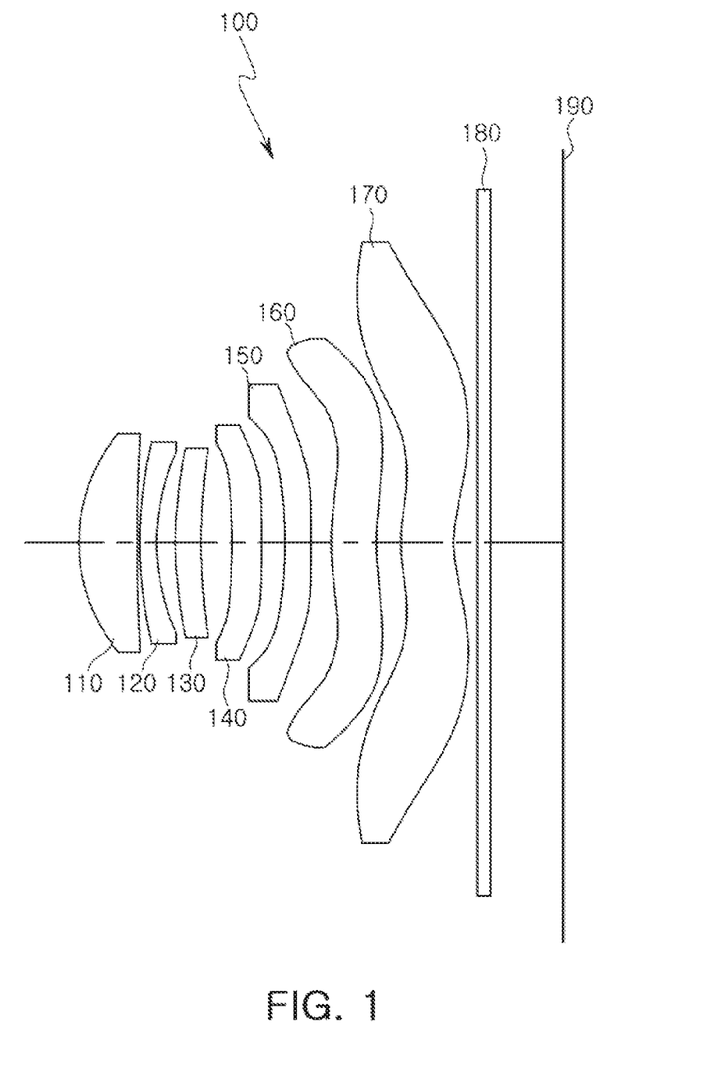
FIG. 1 is a view of an optical imaging system, according to a first example.

The first lens 110 has a positive refractive power. An object-side surface of lens 110 is convex, and an image-side surface of lens 110 is concave. The second lens 120 has a negative refractive power. An object-side surface of lens 120 is convex, and an image-side surface of lens 120 is concave. The third lens 130 has a positive refractive power. An object-side surface of lens 130 is convex, and an image-side surface of lens 130 is concave. The fourth lens 140 has a positive refractive power. An object-side surface of lens 140 is concave, and an image-side surface of lens 140 is convex.

The fifth lens 150 has a negative refractive power. An object-side surface of lens 150 is concave, and an image-side surface of lens 150 is convex. The sixth lens 160 has a positive refractive power. An object-side surface of lens 160 is convex, and an image-side surface of lens 160 is concave. In addition, the sixth lens 160 has an inflection point formed on both of its surfaces. The seventh lens 170 has a negative refractive power. An object-side surface of lens 170 is convex, and an image-side surface of lens 170 is concave. In addition, the seventh lens 170 has an inflection point formed on both of its surfaces.

Optical imaging system 100 further includes a filter 180, an image sensor 190, and a stop ST. Filter 180 may be disposed between seventh lens 170 and image sensor 190. Stop ST may be disposed between second lens 120 and third lens 130 or between third lens 130 and fourth lens 140.

Figure 2:
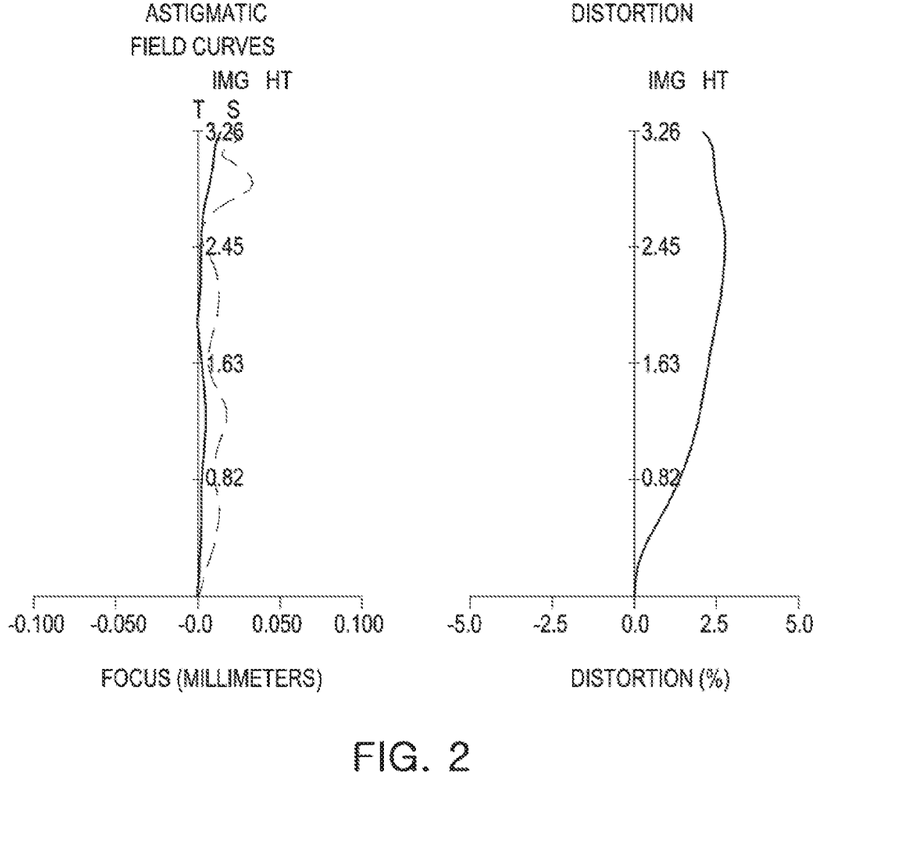
FIG. 2 is a set of graphs illustrating aberration curves of the optical imaging system illustrated in FIG. 1.
Figure 3:
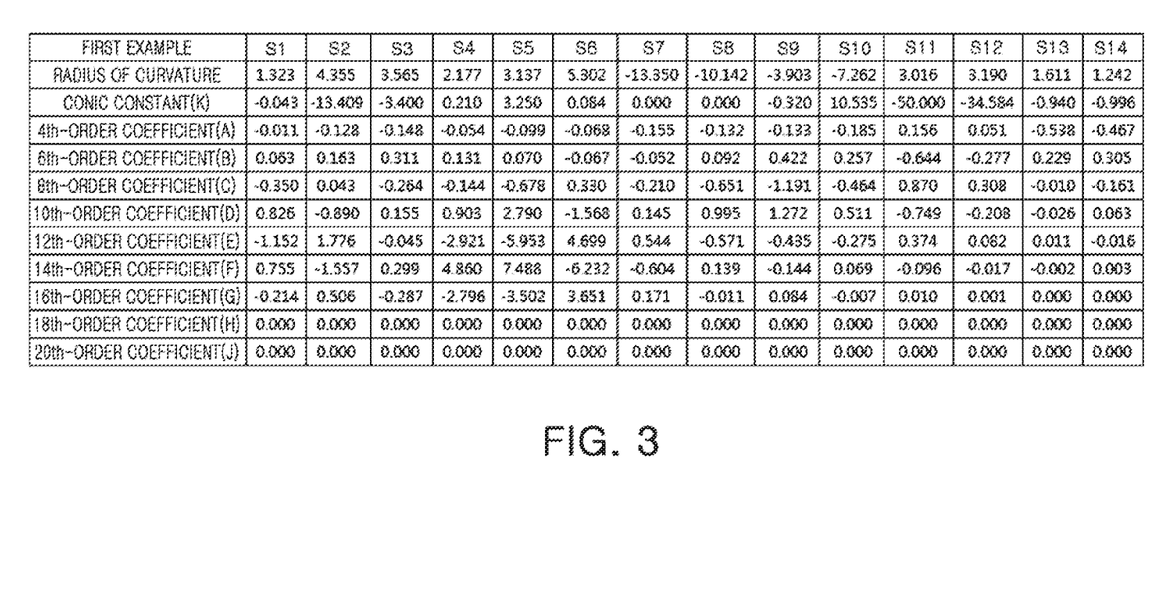
FIG. 3 is a table listing aspherical characteristics of the optical imaging system illustrated in FIG. 1.

The optical imaging system configured as described above represents aberration characteristics as illustrated by the graphs shown in FIG. 2. FIG. 3 lists aspherical characteristics of the optical imaging system, according to the first example. Lens characteristics of the optical imaging system, according to the first example, are described in Table 1.

TABLE 1

| | | First Example | | | |
|---|---|---|---|---|---|
| FOV = | 81.9 | | | | |
| F No = | 2.00 | f = | 3.671 | OAL = | 4.200 |

| Number of surface | | Radius of curvature | Thickness/ Distance | Refractive index | Abbe number | Focal length |
|---|---|---|---|---|---|---|
| S1 | First lens | 1.3225 | 0.5006 | 1.547 | 56.100 | 3.284 |
| S2 | | 4.3551 | 0.0200 | | | |
| S3 | Second | 3.5653 | 0.1500 | 1.669 | 20.350 | −8.740 |
| S4 | lens | 2.1771 | 0.1624 | | | |

TABLE 1-continued

| S5 | Third | 3.1365 | 0.2284 | 1.547 | 56.100 | 13.548 |
|---|---|---|---|---|---|---|
| S6 | lens | 5.3019 | 0.2563 | | | |
| S7 | Fourth | −13.3504 | 0.2620 | 1.547 | 56.100 | 75.065 |
| S8 | lens | −10.1423 | 0.2108 | | | |
| S9 | Fifth lens | −3.9034 | 0.2300 | 1.658 | 21.494 | −13.184 |
| S10 | | −7.2623 | 0.1660 | | | |
| S11 | | 3.0156 | 0.3939 | 1.658 | 21.494 | 44.153 |
| S12 | Sixth lens | 3.1904 | 0.2101 | | | |
| S13 | Seventh lens | 1.6112 | 0.4621 | 1.537 | 55.700 | −17.987 |
| S14 | | 1.2425 | 0.1961 | | | |
| S15 | Filter | Infinity | 0.1100 | 1.519 | 64.197 | |
| S16 | | Infinity | 0.6410 | | | |
| S18 | Imaging plane | Infinity | 0.0000 | | | |

Figure 4:
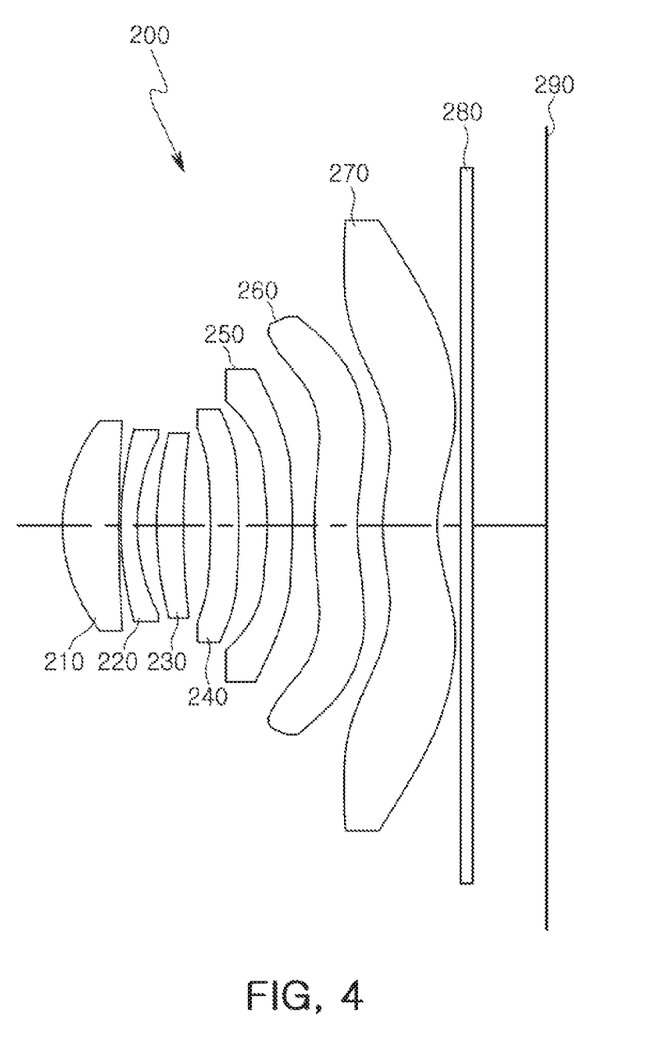
FIG. 4 is a view of an optical imaging system, according to a second example.

With reference to FIG. 4, an optical imaging system, according to a second example, will be described. An optical imaging system 200 includes a first lens 210, a second lens 220, a third lens 230, a fourth lens 240, a fifth lens 250, a sixth lens 260, and a seventh lens 270.

The first lens 210 has a positive refractive power. An object-side surface of lens 210 is convex, and an image-side surface of lens 210 is concave. The second lens 220 has a negative refractive power. An object-side surface of lens 220 is convex, and an image-side surface of lens 220 is concave. The third lens 230 has a positive refractive power. An object-side surface of lens 230 is convex, and an image-side surface of lens 230 is concave. The fourth lens 240 has a positive refractive power. An object-side surface of lens 240 is concave, and an image-side surface of lens 240 is convex.

The fifth lens 250 has a negative refractive power. An object-side surface of lens 250 is concave, and an image-side surface of lens 250 is convex. The sixth lens 260 has a positive refractive power. An object-side surface of lens 260 is convex, and an image-side surface of lens 260 is concave. In addition, the sixth lens 260 has an inflection point formed on both of its surfaces. The seventh lens 270 has a negative refractive power. An object-side surface of lens 270 is convex, and an image-side surface of lens 270 is concave. In addition, the seventh lens 270 has an inflection point formed on both of its surfaces.

Optical imaging system 200 further includes a filter 280, an image sensor 290, and a stop ST. Filter 280 may be disposed between seventh lens 270 and image sensor 290. Stop ST may be disposed between second lens 220 and third lens 230 or between third lens 230 and fourth lens 240.

Figure 5:
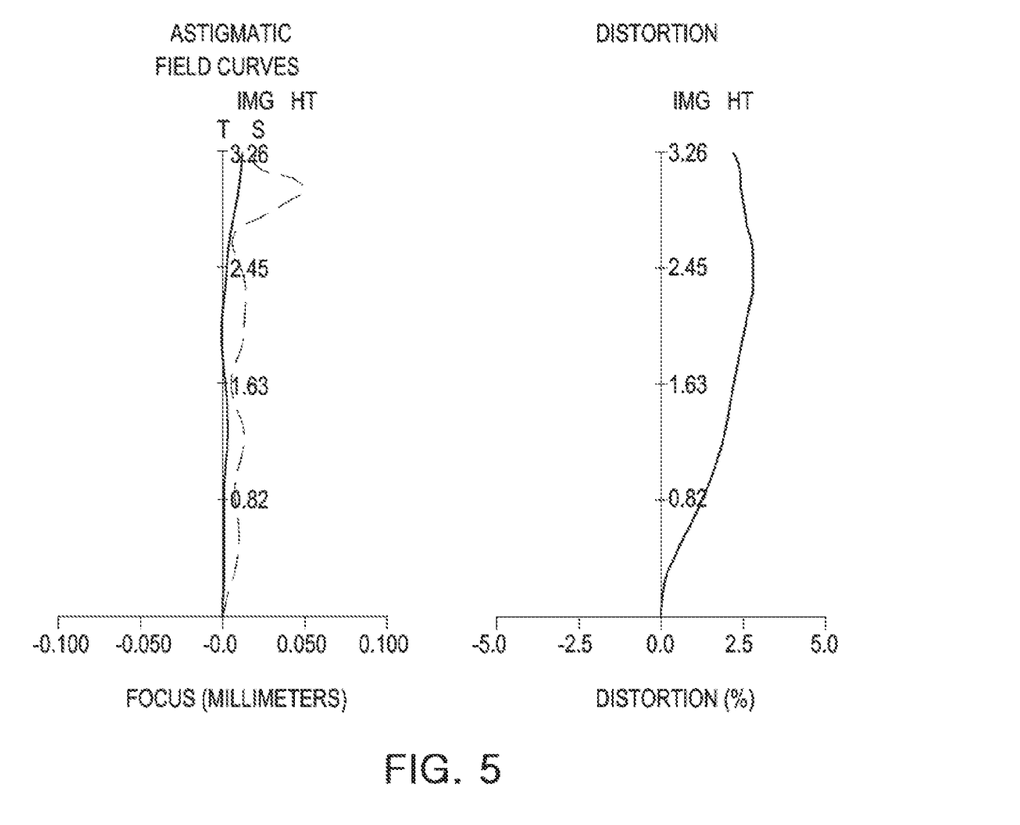
FIG. 5 is a set of graphs illustrating aberration curves of the optical imaging system illustrated in FIG. 4.
Figure 6:
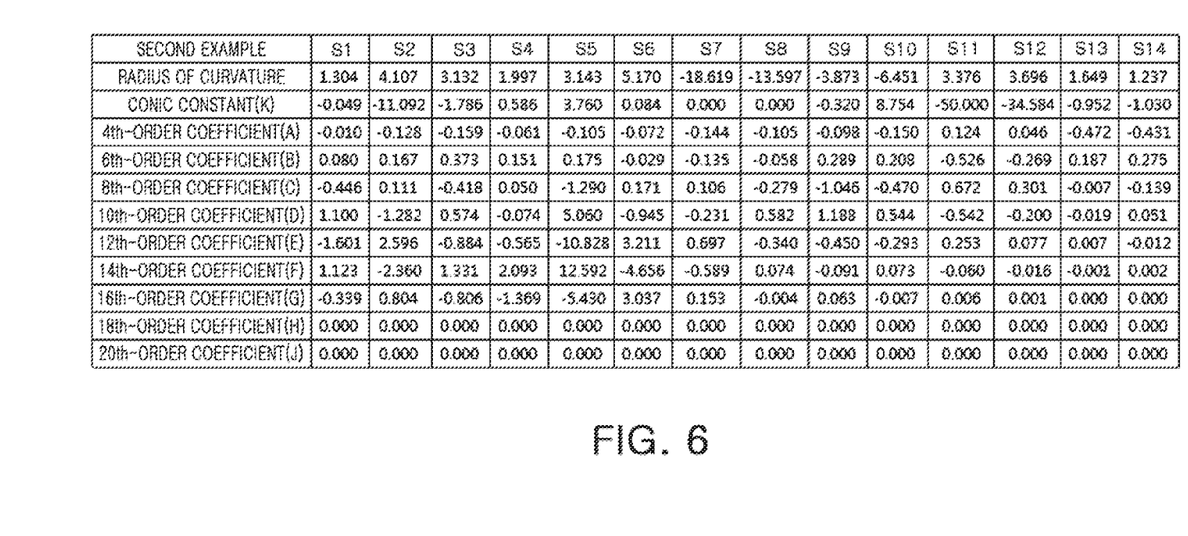
FIG. 6 is a table listing aspherical characteristics of the optical imaging system illustrated in FIG. 4.

The optical imaging system configured as described above represents aberration characteristics as illustrated by the graphs shown in FIG. 5. FIG. 6 lists aspherical characteristics of the optical imaging system, according to the second example. Lens characteristics of the optical imaging system, according to the second example, are described in Table 2.

TABLE 2

| | | | Second Example | | | |
|---|---|---|---|---|---|---|
| FOV = | 81.8 | | | | | |
| F No = | 2.05 | f = | 3.685 | OAL = | 4.200 | |
| Number of surface | | Radius of curvature | Thickness/ Distance | Refractive index | Abbe number | Focal length |
| S1 | First lens | 1.3038 | 0.4873 | 1.547 | 56.100 | 3.293 |
| S2 | | 4.1066 | 0.0200 | | | |
| S3 | Second | 3.1322 | 0.1500 | 1.669 | 20.350 | −8.705 |

TABLE 2-continued

| S4 | lens | 1.9973 | 0.1652 | | | |
|---|---|---|---|---|---|---|
| S5 | Third | 3.1435 | 0.2270 | 1.547 | 56.100 | 14.115 |
| S6 | lens | 5.1702 | 0.2384 | | | |
| S7 | Fourth | −18.6194 | 0.2513 | 1.547 | 56.100 | 90.636 |
| S8 | lens | −13.5970 | 0.2428 | | | |
| S9 | Fifth lens | −3.8728 | 0.2300 | 1.658 | 21.494 | −15.266 |
| S10 | | −6.4514 | 0.1738 | | | |
| S11 | Sixth | 3.3763 | 0.3820 | 1.658 | 21.494 | 40.265 |
| S12 | lens | 3.6956 | 0.2187 | | | |
| S13 | Seventh lens | 1.6490 | 0.4759 | 1.537 | 55.700 | −15.456 |
| S14 | | 1.2370 | 0.1961 | | | |
| S15 | Filter | Infinity | 0.1100 | 1.519 | 64.197 | |
| S16 | | Infinity | 0.6320 | | | |
| S18 | Imaging plane | Infinity | 0.0000 | | | |

Figure 7:
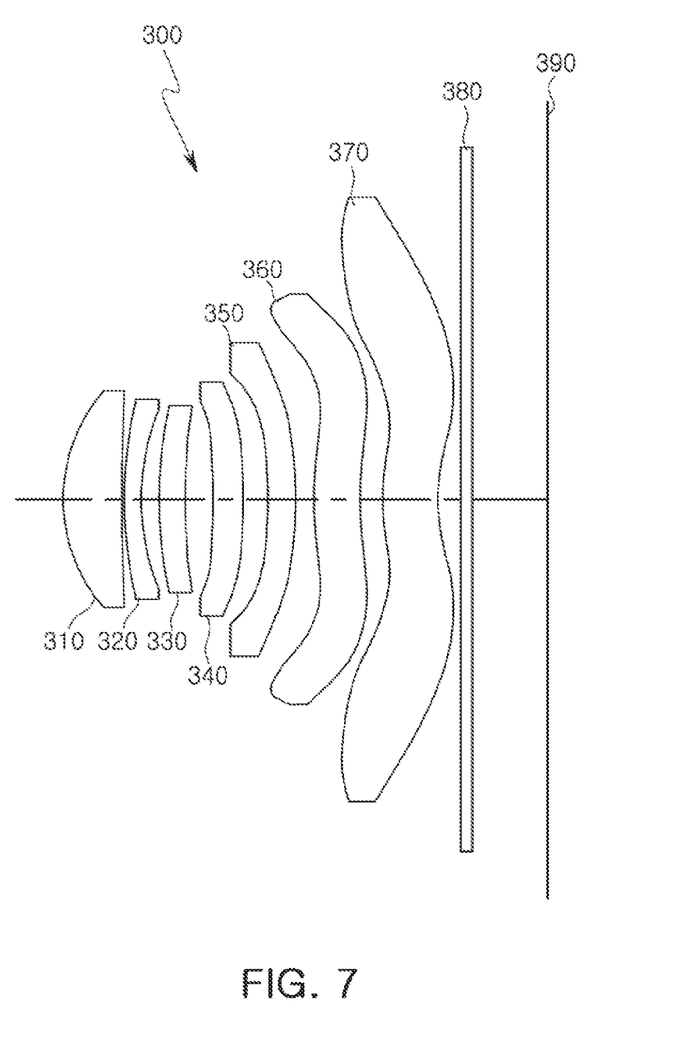
FIG. 7 is a view of an optical imaging system, according to a third example.

With reference to FIG. 7, an optical imaging system, according to a third example, will be described. An optical imaging system 300 includes a first lens 310, a second lens 320, a third lens 330, a fourth lens 340, a fifth lens 350, a sixth lens 360, and a seventh lens 370.

The first lens 310 has a positive refractive power. An object-side surface of lens 310 is convex, and an image-side surface of lens 310 is concave. The second lens 320 has a negative refractive power. An object-side surface of lens 320 is convex, and an image-side surface of lens 320 is concave. The third lens 330 has a positive refractive power. An object-side surface of lens 330 is convex, and an image-side surface of lens 330 is concave. The fourth lens 340 has a positive refractive power. An object-side surface of lens 340 is concave, and an image-side surface of lens 340 is convex.

The fifth lens 350 has a negative refractive power. An object-side surface of lens 350 is concave, and an image-side surface of lens 350 is convex. The sixth lens 360 has a positive refractive power. An object-side surface of lens 360 is convex, and an image-side surface of lens 360 is concave. In addition, the sixth lens 360 has an inflection point formed on both of its surfaces. The seventh lens 370 has a negative refractive power. An object-side surface of lens 370 is convex, and an image-side surface of lens 370 is concave. In addition, the seventh lens 370 has an inflection point formed on both of its surfaces.

Optical imaging system 300 further includes a filter 380, an image sensor 390, and a stop ST. Filter 380 may be disposed between seventh lens 370 and image sensor 390. Stop ST may be disposed between second lens 320 and third lens 330 or between third lens 330 and fourth lens 340.

Figure 8:
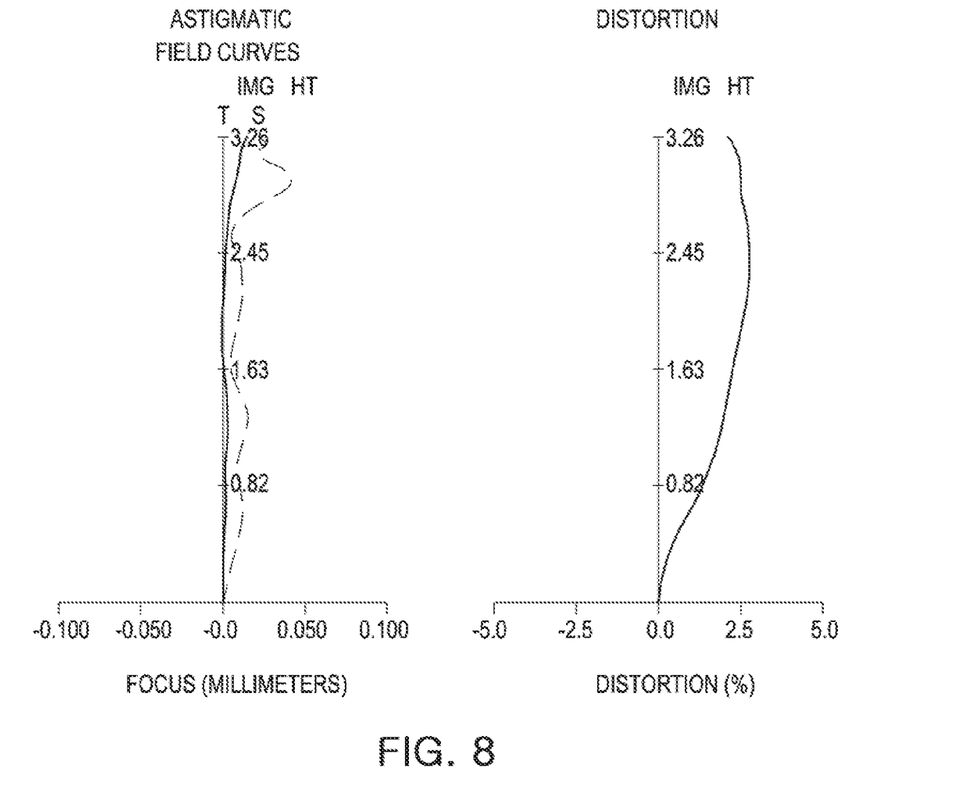
FIG. 8 is a set of graphs illustrating aberration curves of the optical imaging system illustrated in FIG. 7.
Figure 9:
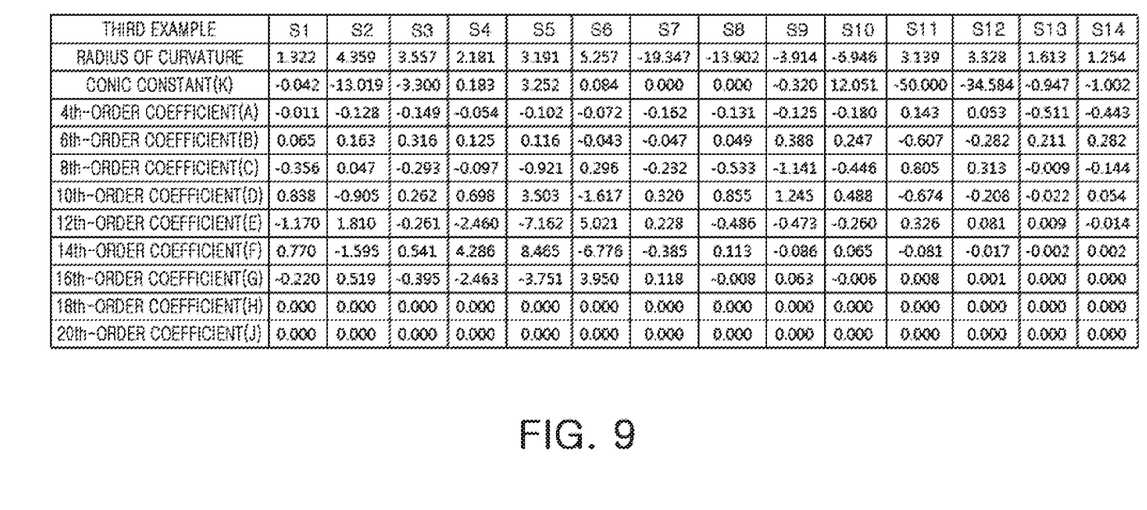
FIG. 9 is a table listing aspherical characteristics of the optical imaging system illustrated in FIG. 7.

The optical imaging system configured as described above represents aberration characteristics as illustrated by the graphs shown in FIG. 8. FIG. 9 lists aspherical characteristics of the optical imaging system, according to the third example. Lens characteristics of the optical imaging system, according to the third example, are described in Table 3.

TABLE 3

| | | | Third Example | | | |
|---|---|---|---|---|---|---|
| FOV = | 82.1 | | | | | |
| F No = | 1.99 | f = | 3.661 | OAL = | 4.200 | |
| Number of surface | | Radius of curvature | Thickness/ Distance | Refractive index | Abbe number | Focal length |
| S1 | First lens | 1.3218 | 0.4999 | 1.547 | 56.100 | 3.280 |
| S2 | | 4.3592 | 0.0200 | | | |
| S3 | Second lens | 3.5574 | 0.1500 | 1.669 | 20.350 | −8.812 |
| S4 | | 2.1808 | 0.1605 | | | |

TABLE 3-continued

| S5 | Third | 3.1908 | 0.2251 | 1.547 | 56.100 | 14.304 |
|---|---|---|---|---|---|---|
| S6 | lens | 5.2570 | 0.2445 | | | |
| S7 | Fourth | −19.3465 | 0.2575 | 1.547 | 56.100 | 88.905 |
| S8 | lens | −13.9019 | 0.2233 | | | |
| S9 | Fifth | −3.9145 | 0.2300 | 1.658 | 21.494 | −14.053 |
| | lens | | | | | |
| S10 | | −6.9465 | 0.1659 | | | |
| S11 | Sixth | 3.1391 | 0.3975 | 1.658 | 21.494 | 45.800 |
| S12 | lens | 3.3280 | 0.2000 | | | |
| S13 | Seventh | 1.6131 | 0.4733 | 1.537 | 55.700 | −19.470 |
| | lens | | | | | |
| S14 | | 1.2542 | 0.1961 | | | |
| S15 | Filter | Infinity | 0.1100 | 1.519 | 64.197 | |
| S16 | Imaging | Infinity | 0.6460 | | | |
| S18 | plane | Infinity | 0.0000 | | | |

Table 4 represents a conditional expression value of the optical imaging system, according to the first example to the third example.

TABLE 4

| Conditional Expression | First Example | Second Example | Third Example |
|---|---|---|---|
| f1/f | 0.894 | 0.894 | 0.896 |
| V1-V2 | 35.75 | 35.75 | 35.75 |
| V1-V3 | 0.00 | 0.00 | 0.00 |
| V1-V5 | 34.606 | 34.606 | 34.606 |
| f2/f | −2.380 | −2.362 | −2.407 |
| f3/f | 3.690 | 3.830 | 3.907 |
| |f4/f| | 20.446 | 24.597 | 24.283 |
| f5/f | −3.591 | −4.143 | −3.838 |
| f6/f | 12.026 | 10.927 | 12.510 |
| f7/f | −4.899 | −4.195 | −5.318 |
| OAL/f | 1.144 | 1.140 | 1.147 |
| f1/f2 | −0.376 | −0.378 | −0.372 |
| f2/f3 | −0.645 | −0.617 | −0.616 |
| BFL/f | 0.258 | 0.255 | 0.260 |
| D2/f | 0.005 | 0.005 | 0.005 |

As set forth above, according to examples, an optical imaging system capable of long distance imaging, while being mounted in a small terminal, may be implemented. While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a first lens comprising a concave image-side surface along an optical axis;
a second lens comprising a concave image-side surface along the optical axis;
a third lens comprising a positive refractive power;
a fourth lens comprising a positive refractive power and a concave object-side surface in a paraxial region;
a fifth lens;
a sixth lens comprising a positive refractive power; and
a seventh lens comprising a convex object-side surface along the optical axis,
wherein the first lens to the seventh lens are sequentially disposed from an object side toward an imaging plane,
wherein the optical imaging system comprises a total number of seven lenses with refractive power,
wherein a radius of curvature of an object-side surface of the second lens is greater than a radius of curvature of an image-side surface of the sixth lens, and
wherein a radius of curvature of an image-side surface of the fifth lens is greater than a radius of curvature of an object-side surface of the fourth lens.

2. The optical imaging system of claim 1, wherein an object-side surface of the first lens is convex along the optical axis.

3. The optical imaging system of claim 1, wherein an object-side surface of the second lens is convex along the optical axis.

4. The optical imaging system of claim 1, wherein an object-side surface of the third lens is convex along the optical axis.

5. The optical imaging system of claim 1, wherein an image-side surface of the third lens is concave along the optical axis.

6. The optical imaging system of claim 1, wherein an object-side surface of the fifth lens is concave along the optical axis.

7. The optical imaging system of claim 1, wherein an image-side surface of the fifth lens is convex along the optical axis.

8. The optical imaging system of claim 1, wherein an object-side surface of the sixth lens is convex along the optical axis.

9. The optical imaging system of claim 1, wherein an image-side surface of the sixth lens is concave along the optical axis.

10. The optical imaging system of claim 1, wherein an image-side surface of the seventh lens is concave along the optical axis.

11. An optical imaging system, comprising:
a first lens, a second lens, a third lens having a convex object-side surface, a fourth lens, a fifth lens having a concave object-side surface in a paraxial region, a sixth lens having a concave image-side surface, and a seventh lens, sequentially disposed from an object side toward an imaging plane,
wherein the optical imaging system satisfies the following Conditional Expressions:

$$f2/f < -2.0 \text{ and } OAL/f < 1.4$$

where f represents an overall focal length of the optical imaging system, f2 is a focal length of the second lens, and OAL represents a distance from an object-side surface of the first lens to the imaging plane,
wherein the optical imaging system comprises a total number of seven lenses with refractive power,
wherein a radius of curvature of an object-side surface of the second lens is greater than a radius of curvature of an image-side surface of the sixth lens, and wherein a radius of curvature of an image-side surface of the fifth lens is greater than a radius of curvature of an object-side surface of the fourth lens.

12. The optical imaging system of claim 11, wherein the optical imaging system satisfies the following Conditional Expression:

$$0 < f1/f < 2.0$$

where f1 represents a focal length of the first lens.

13. The optical imaging system of claim 11, wherein the optical imaging system satisfies the following Conditional Expressions:

$$25 < V1-V2 < 45,$$

$$V1-V3 < 25, \text{ and}$$

$$25 < V1-V5 < 45$$

where V1 represents an Abbe number of the first lens, V2 represents an Abbe number of the second lens, V3 represents an Abbe number of the third lens, and V5 represents an Abbe number of the fifth lens.

14. The optical imaging system of claim 11, wherein the optical imaging system satisfies the following Conditional Expression:

$$1.5 < f3/f$$

where f3 represents a focal length of the third lens.

15. The optical imaging system of claim 11, wherein the optical imaging system satisfies the following Conditional Expression:

$$3.0 < |f4/f|$$

where f4 represents a focal length of the fourth lens.

16. The optical imaging system of claim 11, wherein an image-side surface of the first lens is concave, and an object-side surface of the fourth lens is concave.

* * * * *